June 3, 1947.  R. M. NORTON  2,421,576
RETARDED FLOAT CONTROL MECHANISM FOR COAL WASHING JIGS
Filed March 23, 1944  3 Sheets-Sheet 1
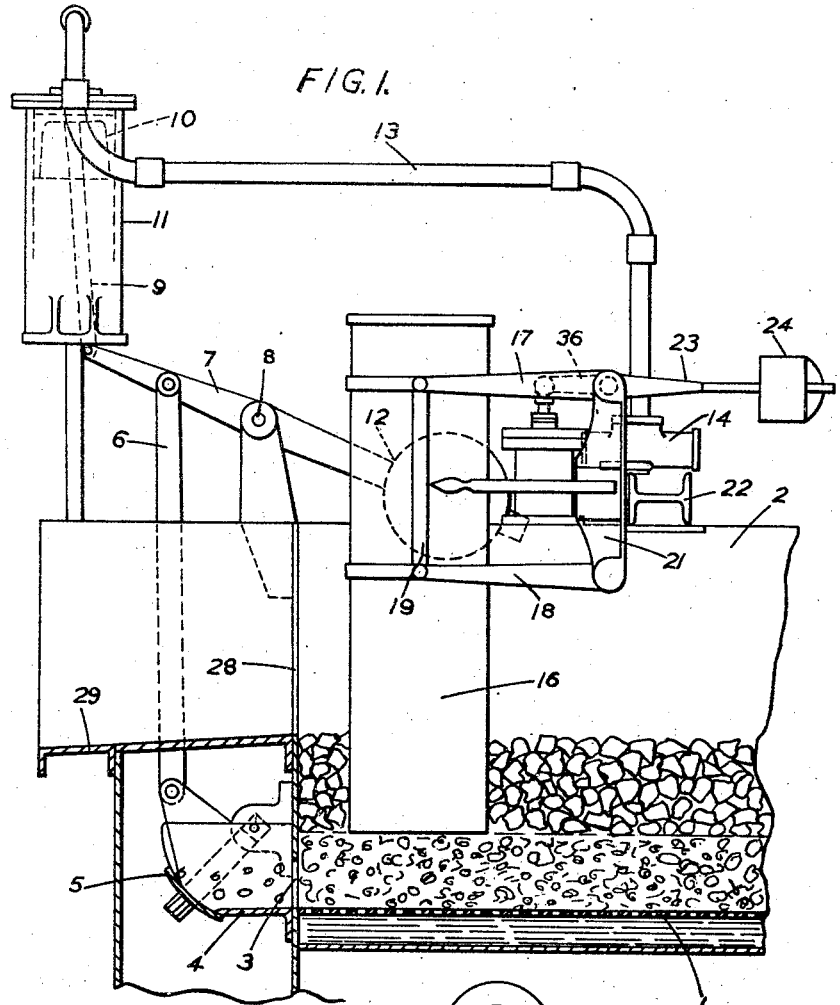
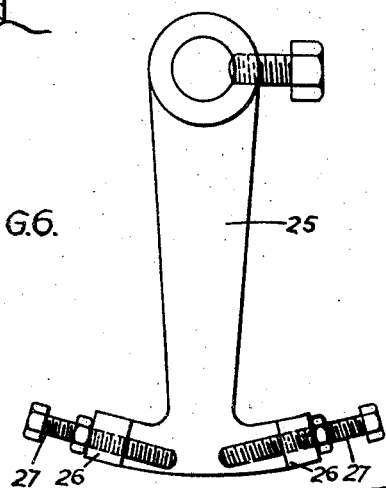
Inventor
R. M. NORTON
By
Attorneys

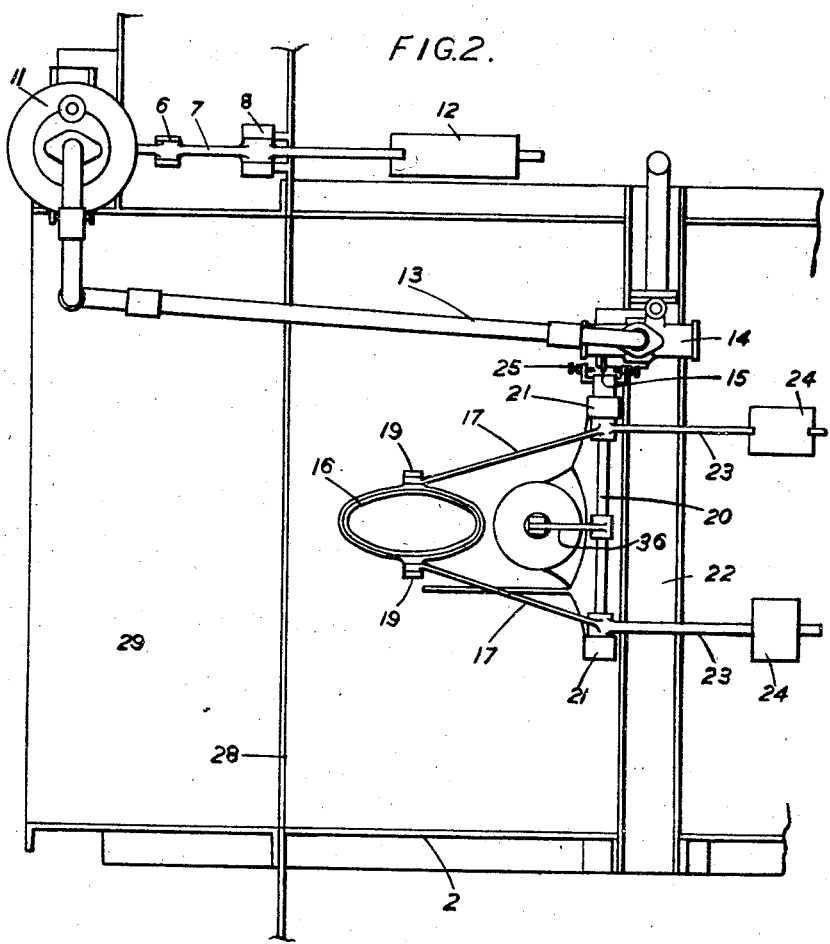
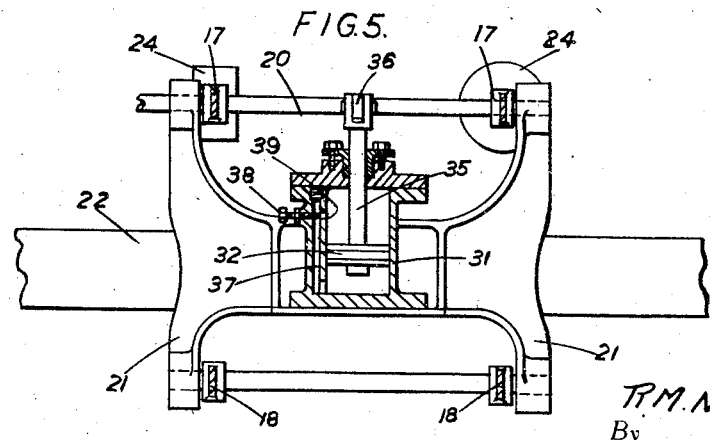

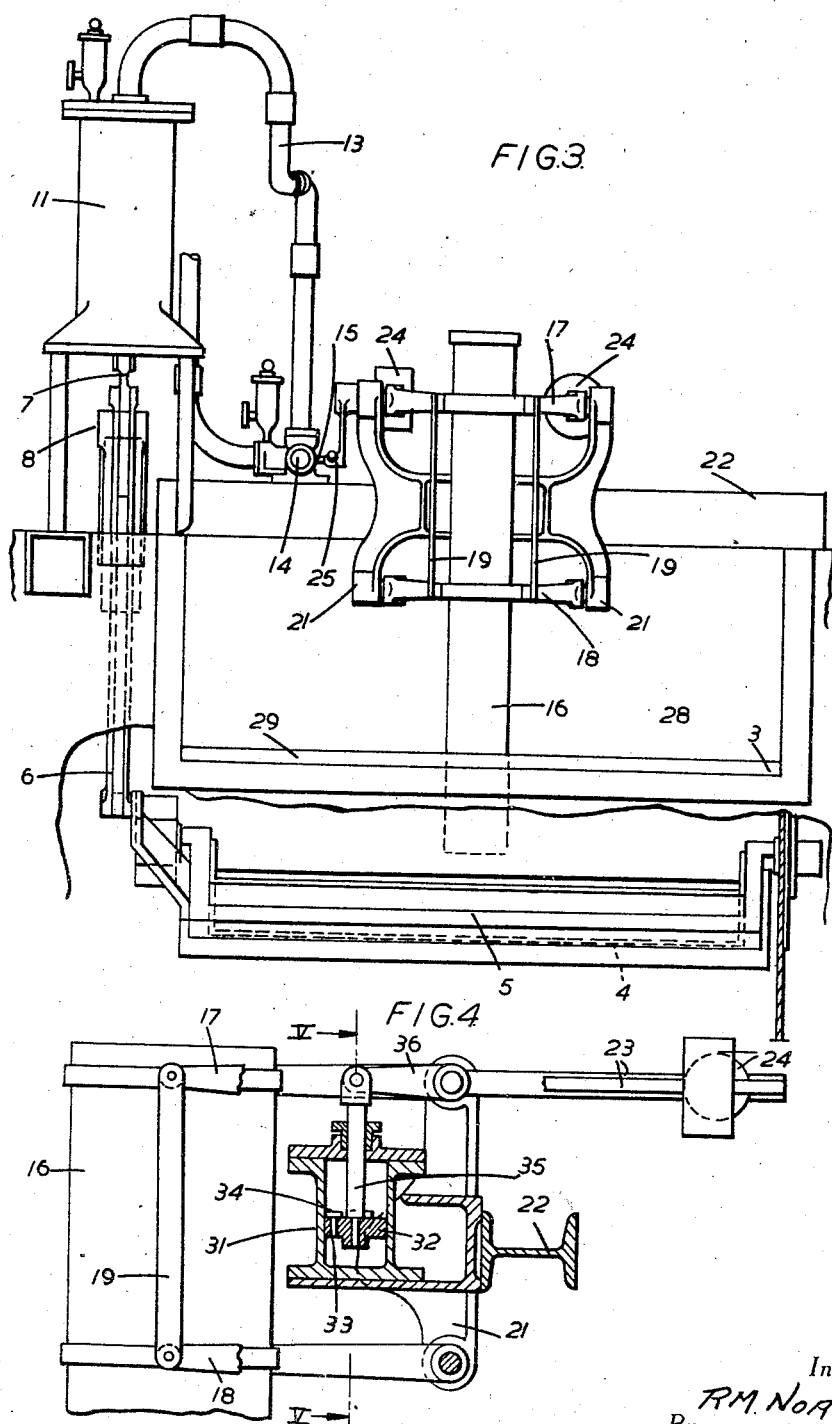

Patented June 3, 1947

2,421,576

UNITED STATES PATENT OFFICE 2,421,576

RETARDED FLOAT CONTROL MECHANISM FOR COAL WASHING JIGS

Ronald Mervyn Norton, Tividale, Tipton, England

Application March 23, 1944, Serial No. 527,743
In Great Britain April 7, 1943

4 Claims. (Cl. 209—496)

This invention relates to jigs for washing coal or other material by stratification of the materials according to density. In such jigs the separation of coal from impurities is effected by subjecting the materials to currents of water that rise and fall alternately. It is common to employ a float to record continuously the varying quantities of impurities present and to operate through suitable relay mechanism the parts which mechanically control the rate of discharge of the reject product. The invention relates to that kind of jig in which there is such a float.

Hitherto floats counterbalanced to sink to a level corresponding with the level of material of a certain density in the stratified bed have been designed to rise and fall freely with the pulsation of the material forming the washing bed. So long as the quantity of refuse passing out remains constant such a float will move up and down between two definite points, but since the quantity of refuse is not changing there must be no change in the rate of discharge. Therefore, the connection between the float and the relay must allow the float to oscillate between the points in question, that is to say, through a distance equal to the amplitude of the pulsations of the water, without affecting the relay. No difficulty arises in doing this so long as the amplitude of the pulsations remains substantially constant. It is found in practice, however, that variations in the nature of the materials forming the washing bed produce appreciable variation in the amplitude of the pulsations, and it is therefore necessary to adjust the apparatus so that there is no action on the relay under conditions of maximum amplitude of pulsation; and so, when the amplitude of pulsation is not at its maximum the quantity of refuse may vary without the relay being affected. In consequence there is no adjustment of the rate of discharge to correspond with variation in the quantity of refuse, so that the operation is not properly controlled.

The principal object of this invention is to allow the float to fall freely and yet to retard or damp its upward movement.

Another object of the invention is so to control the movement of the float that the amplitude of movement of the float within which the relay is not affected can be reduced.

A further object of the invention is to render more sensitive the automatic operation of the jig under the control of the float.

In my invention I provide a device to retard or damp the upward movement of the float without materially reducing the rate at which the float will fall. It will be understood that it is the position of the float at the bottom of its stroke that registers the true depth of the refuse present and that the position of the float at the top of its stroke merely registers the depth of the refuse plus the amplitude of pulsation, so it is important to allow the float freely to take up its natural level at the bottom of its stroke.

One convenient form of device that may be used is a dashpot constructed to allow liquid to flow easily in one direction but to offer considerable resistance to its flow in the opposite direction.

The preferred construction according to my invention is shown by way of example in the accompanying drawings, in which:

Figure 1 shows one end of the jig in side elevation, partly in section;

Figure 2 is a plan and Figure 3 an end elevation of the parts shown in Figure 1;

Figure 4 is a side elevation of the float with the damping device shown in vertical section;

Figure 5 is a section on the line V—V in Figure 4; and

Figure 6 shows one part in detail.

In the jig shown the materials are stratified on a perforated plate 1 that forms a horiozntal partition on a casing 2 in which water is caused to move up and down in pulsating fashion by means not shown. The refuse sinks to the bottom and is discharged through an opening 3 onto a shelf 4. A quadrant gate 5 moves across the forward edge of the shelf 4, so that the discharge of the refuse is controlled by the position of this gate, which is linked to a connecting rod 6 which is in turn linked to a lever 7 mounted about a fulcrum 8. One end of this lever 7 is pivoted to a piston rod 9, which is directly connected to a piston 10 moving in a cylinder 11. The other end of the lever 7 carries a counter-balance weight 12 so that the gate 5 tends to move into its uppermost position, that is to say, the one in which it constitutes the greatest obstruction to the discharge of the refuse, and is moved downwards to allow the refuse to flow out more freely when compressed air is permitted to flow into the cylinder 11 through a pipe 13. The entry of compressed air into this pipe is controlled by a pilot valve 14 that includes a slide valve working in a casing, the slide valve being rigid with a projecting arm 15. This whole valve constitutes a relay, and the arm 15 is a relay arm which must be moved if the rate of discharge of the refuse is to be varied.

A float 16, carried by a parallel-linkage mechanism consisting of substantially horizontal arms 17 and 18 and vertical arms 19, is provided to sink through the material that is being stratified until it rests on material of predetermined density, so that it moves up and down as the layer of material of density equal to or greater than this value increases or decreases in depth, and the float also moves up and down with the pulsating water. The horizontal arms 17 of the linkage are rigidly connected to a rod 20 which is carried in bearings in brackets 21 fixed to a crossgirder 22. Arms 23 carrying counter-balance weights 24 project rearwardly from the members 17. At one end of the rod 20 a calliper arm 25 is rigidly fixed so that it rocks with the rod and at its lower end it is formed with two bosses 26 which receive screws 27, the inner ends of which lie one at each side of the relay arm 15. Thus the relay arm is moved whenever one or other of the calliper screws 27 engages it. The gap between the ends of these screws 27 is such that during the normal stroke of the float neither screw quite comes into contact with the relay arm and it is this gap that must be made big enough to ensure that so long as the quantity of refuse remains constant the relay arm is not moved under conditions of maximum amplitude of pulsation.

The parts of the jigs so far described are of standard construction and many such jigs are in use at the present time. As a rule there is provision for discharge of refuse at each end of the jig, and accordingly there is a float and relay mechanism at each end. The washed coal forming the upper part of the stratified material passes out through an opening 28 over a shelf 29.

The device provided according to the present invention for damping the movement of the float comprises a dashpot in the form of a cylinder 31 containing a piston 32 with an opening 33 controlled by a non-return valve 34. The piston 32 is connected by a rod 35 to one end of an arm 36, the other end of which is keyed to the rod 20 so that the piston moves within the cylinder as the float moves up and down. A by-pass pipe 37 controlled by the valve 38 that closes an opening 39 in the wall of the cylinder 31 to a greater or less extent serves to connect the parts of the cylinder on the two sides of the piston 32. The cylinder is filled with oil or other liquid so that when the float, and therefore the piston rod 35, moves downwardly the liquid will pass freely from the lower to the upper side of the piston through the opening 33, but when the float tends to move upwards the non-return valve 34 will shut, and accordingly the float must force the liquid through the by-pass pipe 37 in order to lift the piston and itself to move upwards.

In consequence of the provision of the damping device, it is possible to make the gap between the ends of the calliper screws 27 only about half that which is necessary in the absence of the damping device.

I claim:

1. In a washing jig that includes a float responsive vertically to the level of division between two strata of material undergoing treatment in the jig, and mechanism actuated by the float for adjusting the discharge level of the jig to that of the strata division; means for preventing changes in the vertical position of the float relative to the level of division between the two strata, said means comprising a device for retarding upward movement of the float while allowing it to descend freely.

2. In a washing jig that includes a float responsive vertically to the level of division between two strata of material undergoing treatment in the jig, and mechanism actuated by the float for adjusting the discharge level of the jig to that of the strata division; means for preventing changes in the vertical position of the float relative to the level of division between the two strata, the said means comprising a fixed fluid-containing cylinder and a piston therein connected to the float, and means permitting free flow of the fluid past the piston as the latter is moved by the float in descending, and for restricting such flow as the piston is moved by the float in ascending.

3. In a washing jig that includes means for controlling the discharge of material therefrom, and a float for actuating the discharge-controlling means and responsive vertically to the level of division between two strata in the material undergoing treatment in the jig; a dashpot including a cylinder containing a body of liquid and a piston in said cylinder, and having an opening through it, one of said elements being mechanically connected to the float to move therewith and the other to the discharge-controlling means for actuating said means, non-return valve means controlling the opening in the piston to permit free flow of the liquid therethrough only on downward movement of the float, and means forming a by-pass circuit past the piston for the liquid to permit restricted flow of said liquid past the piston upon upward movement of said float.

4. In a washing jig that includes a float responsive vertically to the level of division between two strata of material undergoing treatment in the jig, and means actuated by the float for controlling the discharge of material from the jig; means for preventing changes in the vertical position of the float relative to the level of division between the two strata, said means comprising a device for retarding upward movement of the float while allowing it to descend freely.

RONALD MERVYN NORTON.

REFERENCES CITED

The following references are of record in the file of this patent:

UNITED STATES PATENTS

| Number | Name | Date |
|---|---|---|
| 2,253,760 | Burnett | Aug. 26, 1941 |
| 41,083 | McDonald | Jan. 5, 1864 |
| 968,468 | Halbleib | Aug. 23, 1910 |